US008175900B2

(12) United States Patent
Danielsen (10) Patent No.: US 8,175,900 B2
(45) Date of Patent: May 8, 2012

(54) LIFE INSURANCE STRATEGIC VALUE

(75) Inventor: Robert G. Danielsen, Minnetrista, MN (US)

(73) Assignee: The Trustee and Successor Trustees of RGD 2006 Trust, Minnetrista, MN (US)

( * ) Notice: Subject to any disclaimer, the term of this patent is extended or adjusted under 35 U.S.C. 154(b) by 450 days.

(21) Appl. No.: 12/395,941

(22) Filed: Mar. 2, 2009

(65) Prior Publication Data

US 2010/0223077 A1  Sep. 2, 2010

(51) Int. Cl.
*G06Q 40/00*   (2012.01)
(52) U.S. Cl. ............... 705/4; 705/35; 705/36; 705/36 R; 705/37; 705/38
(58) Field of Classification Search ................ 705/4, 35, 705/36, 36 R, 37, 38
See application file for complete search history.

(56) References Cited

U.S. PATENT DOCUMENTS

| | | | |
|---|---|---|---|
| 4,718,009 A | 1/1988 | Cuervo | |
| 4,750,121 A * | 6/1988 | Halley et al. | 705/35 |
| 4,839,804 A | 6/1989 | Roberts et al. | |
| 4,876,648 A | 10/1989 | Lloyd | |
| 5,025,138 A | 6/1991 | Cuervo | |
| 5,136,502 A | 8/1992 | Van Remortel et al. | |
| 5,523,942 A | 6/1996 | Tyler et al. | |
| 5,590,037 A | 12/1996 | Ryan et al. | |
| 5,673,402 A | 9/1997 | Ryan et al. | |
| 5,752,236 A | 5/1998 | Sexton et al. | |
| 5,774,881 A * | 6/1998 | Friend et al. | 705/36 R |
| 5,802,500 A | 9/1998 | Ryan et al. | |
| 5,806,042 A * | 9/1998 | Kelly et al. | 705/4 |
| 5,839,118 A | 11/1998 | Ryan et al. | |
| 5,893,071 A | 4/1999 | Cooperstein | |
| 5,926,800 A | 7/1999 | Baronowski et al. | |
| 5,956,691 A * | 9/1999 | Powers | 705/4 |
| 5,966,693 A | 10/1999 | Burgess | |
| 6,041,304 A * | 3/2000 | Meyer et al. | 705/4 |
| 6,205,434 B1 | 3/2001 | Ryan et al. | |
| 6,304,859 B1 * | 10/2001 | Ryan et al. | 705/38 |
| 6,330,541 B1 * | 12/2001 | Meyer et al. | 705/36 R |
| 6,456,979 B1 | 9/2002 | Flagg | |
| 6,611,815 B1 | 8/2003 | Lewis et al. | |

(Continued)

OTHER PUBLICATIONS

Sam Rosenfeld, Life Settlements: Signposts to a Principal Asset Class, Working Paper #09-20, The Wharton School, University of Pennsylvania, Whatorn Financial Institutions Centre, Feb. 9, 2009.*

*Primary Examiner* — Ella Colbert
*Assistant Examiner* — Barbara Amelunxen
(74) *Attorney, Agent, or Firm* — Brooks, Cameron & Huebsch, PLLC (57) ABSTRACT

The present disclosure includes devices, methods, and systems for determining the strategic value of a life insurance strategy at a future point in time. One device embodiment can include a processor, a memory coupled to the processor, and program instructions stored in the memory and executable by the processor to perform a statistical sampling method to determine a strategic value of a life insurance strategy at a number of particular future points in time using a death benefit value of a life insurance policy, a cash surrender value of the policy, a mortality probability for an insured subject of the policy, and a projected investment return on a reinvestment of the death benefit value, at each of the number of particular future points in time.

14 Claims, 10 Drawing Sheets

U.S. PATENT DOCUMENTS

| | | | |
|---|---|---|---|
| 6,684,189 B1 | 1/2004 | Ryan et al. | |
| 6,684,190 B1* | 1/2004 | Powers et al. | 705/36 R |
| 6,999,935 B2 | 2/2006 | Parankirinathan | |
| 7,089,201 B1 | 8/2006 | Dellinger et al. | |
| 7,376,608 B1* | 5/2008 | Dellinger et al. | 705/36 R |
| 7,376,609 B2* | 5/2008 | Clark et al. | 705/36 R |
| 7,454,379 B1* | 11/2008 | Wolzenski et al. | 705/37 |
| 7,603,306 B2* | 10/2009 | Macey | 705/35 |
| 7,634,420 B2 | 12/2009 | Kendall et al. | 705/4 |
| 7,752,120 B2* | 7/2010 | Ghani | 705/37 |
| 7,778,904 B1* | 8/2010 | Lyons | 705/35 |
| 2002/0091610 A1 | 7/2002 | Smith | |
| 2002/0138386 A1* | 9/2002 | Maggioncalda et al. | 705/36 |
| 2003/0074231 A1* | 4/2003 | Renes et al. | 705/4 |
| 2003/0088444 A1* | 5/2003 | Garbin et al. | 705/4 |
| 2003/0110061 A1* | 6/2003 | Lakenbach et al. | 705/4 |
| 2003/0191672 A1 | 10/2003 | Kendall et al. | |
| 2004/0019506 A1 | 1/2004 | Struchtemeyer et al. | |
| 2004/0064391 A1* | 4/2004 | Lange | 705/36 |
| 2004/0128233 A1* | 7/2004 | Jarzmik | 705/38 |
| 2004/0177021 A1* | 9/2004 | Carlson et al. | 705/36 |
| 2004/0267647 A1 | 12/2004 | Brisbois | |
| 2005/0071204 A1 | 3/2005 | Parankirinathan | |
| 2005/0149434 A1 | 7/2005 | Selby | |
| 2005/0216316 A1 | 9/2005 | Brisbois et al. | |
| 2005/0234791 A1* | 10/2005 | Krasnerman | 705/35 |
| 2005/0267785 A1 | 12/2005 | Parankirinathan | |
| 2006/0143055 A1* | 6/2006 | Loy et al. | 705/4 |
| 2006/0206417 A1 | 9/2006 | Selby | |
| 2006/0224487 A1* | 10/2006 | Galdi | 705/35 |
| 2007/0011086 A1 | 1/2007 | Dellinger et al. | |
| 2007/0016455 A1* | 1/2007 | Ryan et al. | 705/4 |
| 2007/0156558 A1 | 7/2007 | Wolzenski et al. | |
| 2007/0162365 A1* | 7/2007 | Weinreb | 705/35 |
| 2007/0185741 A1 | 8/2007 | Hebron et al. | |
| 2007/0299760 A1 | 12/2007 | Lange et al. | |
| 2008/0016099 A1 | 1/2008 | Ikeda | |
| 2008/0040166 A1* | 2/2008 | Foti et al. | 705/4 |
| 2008/0052211 A1* | 2/2008 | Buerger et al. | 705/36 R |
| 2008/0071584 A1* | 3/2008 | Parankirinathan | 705/4 |
| 2008/0133279 A1 | 6/2008 | Pollock et al. | |
| 2008/0162377 A1* | 7/2008 | Pinkas | 705/36 R |
| 2008/0183510 A1 | 7/2008 | Pollock et al. | |
| 2008/0249810 A1* | 10/2008 | Laudato et al. | 705/4 |
| 2008/0270195 A1* | 10/2008 | Gottlieb | 705/4 |
| 2009/0076861 A1* | 3/2009 | Saunders | 705/4 |
| 2009/0198526 A1* | 8/2009 | Golden et al. | 705/4 |
| 2009/0204442 A1* | 8/2009 | Logsdon et al. | 705/4 |
| 2010/0004957 A1* | 1/2010 | Ball | 705/4 |
| 2010/0063853 A1* | 3/2010 | Foti et al. | 705/4 |

* cited by examiner

360
PERFORM A STATISTICAL SAMPLING METHOD TO DETERMINE A STRATEGIC VALUE OF A LIFE INSURANCE STRATEGY AT A NUMBER OF FUTURE POINTS IN TIME USING A DEATH BENEFIT VALUE OF A LIFE INSURANCE POLICY, A CASH SURRENDER VALUE OF THE POLICY, A MORTALITY PROBABILITY OF AN INSURED SUBJECT OF THE POLICY, AND A PROJECTED INVESTMENT RETURN ON A REINVESTMENT OF THE DEATH BENEFIT VALUE AT EACH OF THE NUMBER OF FUTURE POINTS IN TIME

362
DETERMINE A NUMERICAL INDEX VALUE FOR THE STRATEGY AT EACH OF THE NUMBER OF FUTURE POINTS IN TIME USING THE STRATEGIC VALUES AND AMOUNTS OF MONEY PAID INTO THE POLICY UP TO EACH OF THE NUMBER OF FUTURE POINTS IN TIME

364
PRESENT THE STRATEGIC VALUES AND NUMERICAL INDEX VALUES TO A CONSUMER

| FIG. 4A | FIG. 4B |
|---------|---------|
| FIG. 4C | FIG. 4D |
| FIG. 4E | FIG. 4F |

400

INSURED DATA
GENDER: MALE
AGE: 55
UNDERWRITING STATUS: NONSMOKER

REINVESTMENT DISTRIBUTION
MINIMUM: (0.2337)
MOST LIKELY: 0.0552
MAXIMUM: 0.2667

LIFE INSURANCE POLICY LEDGER DATA

| 470 YEAR | 472 AGE | 474 ILLUSTRATED PREMIUM | 476 ILLUSTRATED AFTER-TAX CASH SURRENDER VALUE | 478 ILLUSTRATED DEATH BENEFIT VALUE | 480 5TH PERCENTILE STRATEGIC VALUE |
|---|---|---|---|---|---|
| 1 | 56 | 515,000 | 429,755 | 2,512,027 | 429,755 |
| 2 | 57 | 15,000 | 474,132 | 2,554,430 | 474,132 |
| 3 | 58 | 15,000 | 521,601 | 2,599,906 | 521,601 |
| 4 | 59 | 15,000 | 567,296 | 2,648,864 | 567,296 |
| 5 | 60 | 15,000 | 605,317 | 2,701,510 | 605,317 |
| 6 | 61 | 15,000 | 645,593 | 2,758,023 | 645,593 |
| 7 | 62 | 15,000 | 696,286 | 2,818,549 | 696,286 |
| 8 | 63 | 15,000 | 750,935 | 2,883,190 | 750,935 |
| 9 | 64 | 15,000 | 808,090 | 2,952,151 | 808,090 |
| 10 | 65 | 15,000 | 867,935 | 3,025,750 | 867,935 |
| 11 | 66 | 15,000 | 927,202 | 3,117,072 | 927,202 |
| 12 | 67 | 15,000 | 990,270 | 3,214,948 | 990,270 |
| 13 | 68 | 15,000 | 1,057,473 | 3,319,953 | 1,057,473 |
| 14 | 69 | 15,000 | 1,129,109 | 3,432,601 | 1,129,109 |
| 15 | 70 | 15,000 | 1,205,546 | 3,553,527 | 1,205,546 |
| 16 | 71 | 15,000 | 1,286,977 | 3,683,063 | 1,286,977 |

*Fig. 4A*

GENERAL DATA
ITERATIONS: 10,000
DISCOUNT RATE: 0.0400
LIFE EXPECTANCY: 24.78 YRS
ORDINARY INC TAX RT: 0.4200

PERCENTILE RESULTS FOR
STRATEGIC VALUES AND INDEX VALUES

| 482 | 484 | 486 | 488 | 490 |
|---|---|---|---|---|
| | 50TH PERCENTILE | | 95TH PERCENTILE | |
| INDEX VALUE | STRATEGIC VALUE | INDEX VALUE | STRATEGIC VALUE | INDEX VALUE |
| 0.83 | 429,755 | 0.83 | 429,755 | 0.83 |
| 0.86 | 474,132 | 0.86 | 474,132 | 0.86 |
| 0.88 | 521,601 | 0.88 | 521,601 | 0.88 |
| 0.90 | 567,296 | 0.90 | 567,296 | 0.90 |
| 0.90 | 605,317 | 0.90 | 605,317 | 0.90 |
| 0.91 | 645,593 | 0.91 | 645,593 | 0.91 |
| 0.92 | 696,286 | 0.92 | 2,111,968 | 3.04 |
| 0.93 | 750,935 | 0.93 | 2,557,499 | 3.29 |
| 0.95 | 808,090 | 0.95 | 2,866,949 | 3.46 |
| 0.96 | 867,935 | 0.96 | 2,971,975 | 3.35 |
| 0.97 | 927,202 | 0.97 | 3,117,072 | 3.43 |
| 0.98 | 990,270 | 0.98 | 3,214,948 | 3.39 |
| 0.99 | 1,057,473 | 0.99 | 3,350,314 | 3.42 |
| 1.00 | 1,129,109 | 1.00 | 3,525,336 | 3.41 |
| 1.01 | 1,205,546 | 1.01 | 3,740,276 | 3.38 |
| 1.03 | 1,286,977 | 1.03 | 3,899,656 | 3.38 |

*Fig. 4B*

| 17 | 72 | 15,000 | 1,373,690 | 3,821,707 | 1,373,690 |
| 18 | 73 | 15,000 | 1,465,658 | 3,969,410 | 1,465,658 |
| 19 | 74 | 15,000 | 1,563,252 | 4,126,813 | 1,563,252 |
| 20 | 75 | 15,000 | 1,666,880 | 4,294,621 | 1,666,880 |
| 21 | 76 | 15,000 | 1,776,874 | 4,473,403 | 1,776,874 |
| 22 | 77 | 15,000 | 1,893,594 | 4,663,783 | 1,893,594 |
| 23 | 78 | 15,000 | 2,017,203 | 4,866,039 | 2,017,203 |
| 24 | 79 | 15,000 | 2,147,790 | 5,080,328 | 2,147,790 |
| 25 | 80 | 15,000 | 2,285,407 | 5,306,736 | 2,285,407 |
| 26 | 81 | 15,000 | 2,430,294 | 5,545,679 | 2,430,294 |
| 27 | 82 | 15,000 | 2,582,447 | 5,797,150 | 2,582,447 |
| 28 | 83 | 15,000 | 2,742,309 | 6,061,912 | 2,742,309 |
| 29 | 84 | 15,000 | 2,910,147 | 6,340,426 | 2,910,147 |
| 30 | 85 | 15,000 | 3,086,015 | 6,632,785 | 3,086,015 |
| 31 | 86 | 15,000 | 3,269,841 | 6,938,864 | 3,269,841 |
| 32 | 87 | 15,000 | 3,461,487 | 7,258,426 | 3,461,487 |
| 33 | 88 | 15,000 | 3,660,862 | 7,591,314 | 3,526,446 |
| 34 | 89 | 15,000 | 3,867,966 | 7,937,528 | 3,757,055 |
| 35 | 90 | 15,000 | 4,083,282 | 8,297,900 | 3,741,524 |
| 36 | 91 | 15,000 | 4,305,922 | 8,670,900 | 3,685,628 |
| 37 | 92 | 15,000 | 4,538,409 | 9,060,877 | 3,645,808 |
| 38 | 93 | 15,000 | 4,780,776 | 9,467,889 | 3,609,933 |
| 39 | 94 | 15,000 | 5,033,305 | 9,892,422 | 3,634,789 |
| 40 | 95 | 15,000 | 5,296,220 | 10,334,862 | 3,615,097 |
| 41 | 96 | 15,000 | 5,569,808 | 10,795,703 | 3,768,794 |
| 42 | 97 | 15,000 | 5,856,243 | 11,278,695 | 3,799,735 |
| 43 | 98 | 15,000 | 6,155,926 | 11,784,527 | 3,723,237 |
| 44 | 99 | 15,000 | 6,469,223 | 12,313,833 | 3,803,530 |
| 45 | 100 | 15,000 | 6,796,470 | 12,867,190 | 3,884,022 |
| 46 | 101 | 15,000 | 7,137,963 | 13,445,108 | 3,900,900 |

*Fig. 4C*

| | | | | |
|---|---|---|---|---|
| 1.04 | 1,373,690 | 1.04 | 4,146,488 | 3.40 |
| 1.05 | 1,465,658 | 1.05 | 4,384,064 | 3.39 |
| 1.07 | 1,563,252 | 1.07 | 4,651,236 | 3.48 |
| 1.08 | 1,666,880 | 1.08 | 4,936,626 | 3.58 |
| 1.10 | 1,776,874 | 1.10 | 5,333,551 | 3.59 |
| 1.11 | 1,893,594 | 1.11 | 5,479,753 | 3.59 |
| 1.13 | 2,017,203 | 1.13 | 5,744,349 | 3.54 |
| 1.14 | 2,147,790 | 1.14 | 6,035,466 | 3.61 |
| 1.16 | 2,285,407 | 1.16 | 6,373,595 | 3.55 |
| 1.18 | 2,430,294 | 1.18 | 6,682,228 | 3.62 |
| 1.19 | 2,737,342 | 1.50 | 6,926,553 | 3.58 |
| 1.21 | 3,665,703 | 1.82 | 7,325,795 | 3.62 |
| 1.22 | 4,242,558 | 1.94 | 7,633,891 | 3.56 |
| 1.24 | 4,765,971 | 2.08 | 8,145,402 | 3.54 |
| 1.25 | 5,153,460 | 2.15 | 8,669,425 | 3.60 |
| 1.26 | 5,413,598 | 2.16 | 9,149,858 | 3.70 |
| 1.28 | 5,828,520 | 2.20 | 9,560,627 | 3.71 |
| 1.29 | 6,258,066 | 2.25 | 10,133,330 | 3.79 |
| 1.30 | 6,594,702 | 2.28 | 10,532,180 | 3.77 |
| 1.29 | 6,884,602 | 2.26 | 11,108,790 | 3.84 |
| 1.23 | 7,154,469 | 2.22 | 11,865,890 | 3.85 |
| 1.20 | 7,570,196 | 2.26 | 12,588,280 | 3.97 |
| 1.14 | 7,797,354 | 2.22 | 13,093,620 | 3.89 |
| 1.12 | 7,981,724 | 2.20 | 13,993,880 | 3.90 |
| 1.10 | 8,214,052 | 2.18 | 14,792,030 | 4.05 |
| 1.06 | 8,618,013 | 2.18 | 15,200,700 | 4.06 |
| 1.01 | 8,757,858 | 2.12 | 15,893,600 | 3.98 |
| 0.95 | 9,044,057 | 2.12 | 16,522,960 | 4.01 |
| 0.95 | 9,361,646 | 2.11 | 17,212,350 | 3.92 |
| 0.92 | 9,613,879 | 2.06 | 18,018,340 | 3.92 |

*Fig. 4D*

| 47 | 102 | 15,000 | 7,493,941 | 14,048,002 | 3,956,940 |
| 48 | 103 | 15,000 | 7,864,569 | 14,676,154 | 3,903,247 |
| 49 | 104 | 15,000 | 8,249,951 | 15,329,743 | 3,958,951 |
| 50 | 105 | 15,000 | 8,650,065 | 16,008,732 | 4,081,053 |
| 51 | 106 | 15,000 | 9,065,044 | 16,713,352 | 4,080,249 |
| 52 | 107 | 15,000 | 9,494,652 | 17,443,193 | 4,217,432 |
| 53 | 108 | 15,000 | 9,938,474 | 18,197,542 | 4,150,635 |
| 54 | 109 | 15,000 | 10,395,887 | 18,975,323 | 4,256,940 |
| 55 | 110 | 15,000 | 10,866,004 | 19,775,007 | 4,239,750 |
| 56 | 111 | 15,000 | 11,347,648 | 20,594,566 | 4,173,865 |
| 57 | 112 | 15,000 | 11,839,251 | 21,431,295 | 4,299,522 |
| 58 | 113 | 15,000 | 12,338,814 | 22,281,748 | 4,295,451 |
| 59 | 114 | 15,000 | 12,843,772 | 23,141,503 | 4,312,654 |
| 60 | 115 | 15,000 | 13,350,920 | 24,005,034 | 4,329,050 |
| 61 | 116 | 15,000 | 13,856,237 | 24,865,408 | 4,381,448 |
| 62 | 117 | 15,000 | 14,354,735 | 25,714,025 | 4,390,623 |
| 63 | 118 | 15,000 | 14,840,221 | 26,540,209 | 4,350,056 |
| 64 | 119 | 15,000 | 15,305,000 | 27,330,690 | 4,311,466 |
| 65 | 120 | 15,000 | 15,739,523 | 28,069,006 | 4,499,351 |

*Fig. 4E*

| 0.88 | 9,910,697 | 2.04 | 19,154,800 | 3.91 |
| 0.82 | 10,031,800 | 2.00 | 19,418,070 | 3.86 |
| 0.81 | 10,369,450 | 1.98 | 20,410,730 | 3.84 |
| 0.80 | 10,639,230 | 1.94 | 21,182,000 | 3.91 |
| 0.76 | 10,705,510 | 1.90 | 21,980,640 | 3.85 |
| 0.74 | 10,946,770 | 1.86 | 22,779,240 | 3.89 |
| 0.71 | 11,357,570 | 1.84 | 24,946,440 | 3.99 |
| 0.68 | 11,584,980 | 1.80 | 25,168,050 | 3.99 |
| 0.67 | 11,897,050 | 1.76 | 27,389,400 | 4.10 |
| 0.63 | 12,054,090 | 1.73 | 27,950,460 | 3.97 |
| 0.62 | 12,400,860 | 1.69 | 28,309,260 | 4.05 |
| 0.60 | 12,649,430 | 1.66 | 29,919,960 | 3.90 |
| 0.57 | 13,024,010 | 1.63 | 30,591,600 | 3.93 |
| 0.57 | 13,192,150 | 1.62 | 32,951,060 | 4.04 |
| 0.56 | 13,816,440 | 1.61 | 33,437,670 | 3.96 |
| 0.53 | 14,197,870 | 1.58 | 34,791,510 | 3.88 |
| 0.50 | 14,407,840 | 1.55 | 36,134,810 | 3.94 |
| 0.49 | 14,752,670 | 1.55 | 38,611,360 | 4.05 |
| 0.49 | 14,921,300 | 1.49 | 40,359,110 | 3.97 |

*Fig. 4F*

LIFE INSURANCE STRATEGIC VALUE

TECHNICAL FIELD

The present disclosure relates generally to life insurance, and more particularly, to devices, methods, and systems for determining life insurance strategic value.

BACKGROUND

Life insurance, e.g., a life insurance policy, is a contract between an insurer and an insured subject, wherein the insurer agrees to pay a sum of money to a third party upon the occurrence of the insured subject's death. In return, the insured subject agrees to pay the insurance company a stipulated amount. The insurer may be an insurance company, and the insured subject may be an individual person. The third party may be referred to as a beneficiary, and may be an individual person. The sum of money paid by the insurer may be referred to as a death benefit, and may be paid as a lump sum or at particular intervals. The stipulated amount paid by the insured subject may be referred to as a premium, and may be paid at a particular interval or as a lump sum. A premium paid at a particular interval may remain constant, or may change, e.g., increase, over time.

A beneficiary who receives a death benefit in accordance with a life insurance policy may use the death benefit in a number of ways. For example, the beneficiary may choose to invest the death benefit in a number of investment vehicles, such as stocks, bonds, mutual funds, real estate, and/or commodities, among other investment vehicles.

A life insurance policy may have a cash surrender value associated therewith. A cash surrender value is the amount of money the insured subject receives from the insurer if the insured subject elects to terminate the policy before the insured subject dies. The cash surrender value of a life insurance policy may depend on the amount of the insured subject's premium payments, any crediting to the cash surrender value by the insurance company that may be in the form of interest, dividends, or other credits, and the costs of the policy, all of which may cause the cash surrender value to vary over time. For example, if an insured subject makes premium payments at a particular interval, and the premiums, together with any crediting to the policy, exceed the current costs of the policy, the cash surrender value of the life insurance policy may increase over time. A cash surrender value may be subject to taxation, and may be subject to charges by the insurance company, such as a surrender charge, for example.

A life insurance strategy which includes a life insurance policy may yield a long-term, future strategic value. Such a strategic value may be based on a complex, and often not express, relationship among mortality probabilities, product performance, and investment returns on reinvested death benefits, and may be subject to the uncertainties of mortality projections and economic markets. For example, because it is uncertain when an insured subject will die, the insured subject and/or beneficiary do not know whether, at any given point in the future, the amount of cash accessible from the strategy will be the cash surrender value, the death benefit value, or the death benefit value reinvested from the date of payment. Hence, a strategic value of a life insurance strategy can be difficult to predict.

A life insurance policy strategy having a cash surrender value associated therewith may be illustrated in ledger form, which can include the projected future cash surrender values and the death benefit value. However, the cash surrender values and death benefit value are expressed separately in the ledger, with no evaluation of the probability of which feature of the strategy is likely to represent an amount of the accessible cash at any future point in time. Hence, the ledger does not provide an indication of the strategic value of the strategy at a given future point in time.

DETAILED DESCRIPTION

The present disclosure includes devices, methods, and systems for determining the strategic value of a life insurance strategy at a future point in time. One device embodiment can include a processor, a memory coupled to the processor, and program instructions stored in the memory and executable by the processor to perform a statistical sampling method to determine a strategic value of a life insurance strategy at a number of particular future points in time using a death benefit value of a life insurance policy, a cash surrender value of the policy, a mortality probability for an insured subject of the policy, and a projected investment return on a reinvestment of the death benefit value, at each of the number of particular future points in time.

In the following detailed description of the present disclosure, reference is made to the accompanying figures that form a part hereof, and in which is shown by way of illustration how a number of embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure.

As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate the embodiments of the present disclosure, and should not be taken in a limiting sense.

As used herein, "a number of" something can refer to one or more such things. For example, a number of cash surrender values can refer to one or more cash surrender values.

Figure 1:
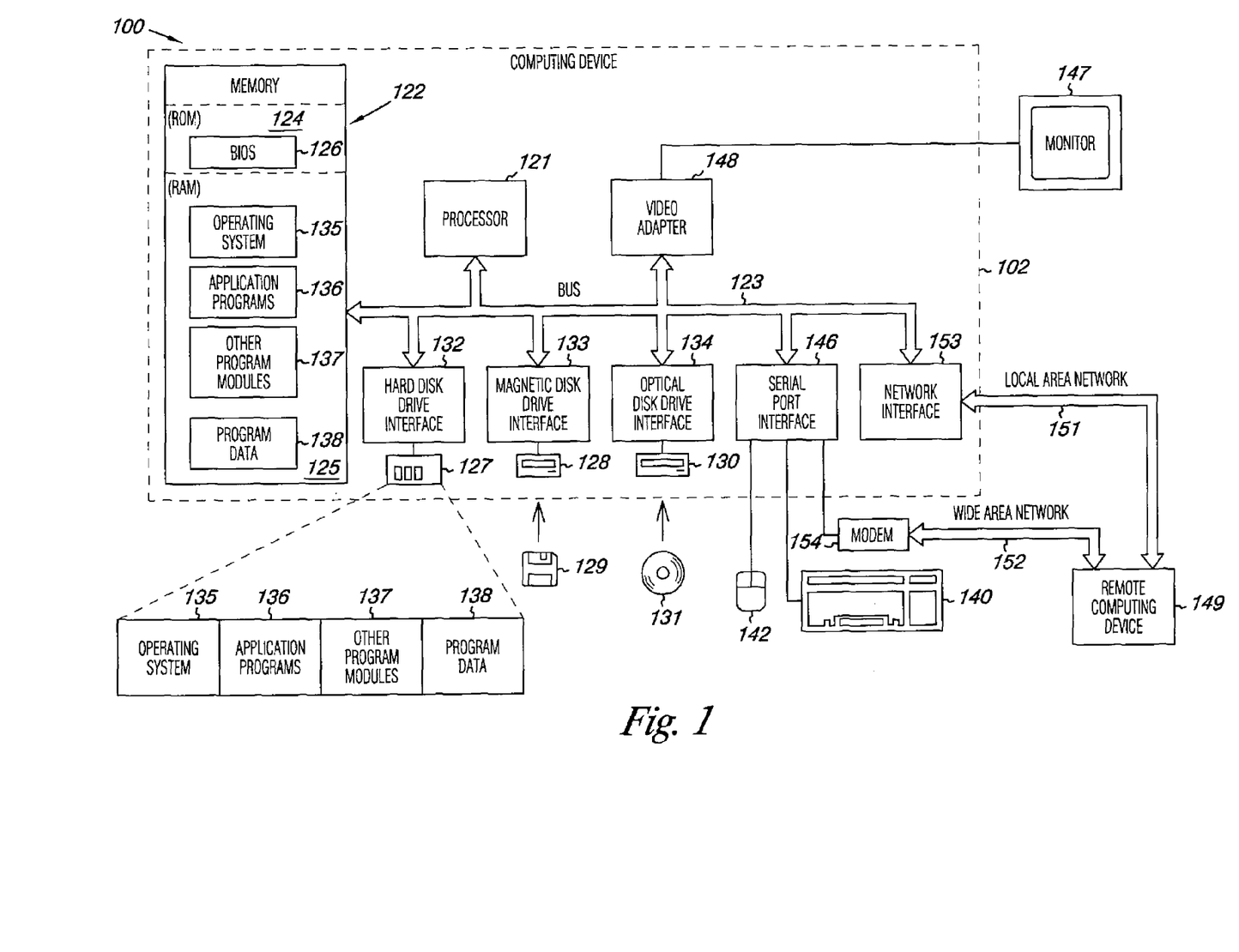
FIG. 1 illustrates a computing system in accordance with a number of embodiments of the present disclosure.

FIG. 1 illustrates a computing system 100 in accordance with a number of embodiments of the present disclosure. The description of FIG. 1 is intended to provide a brief, general description of suitable computer hardware and a suitable computing environment in accordance with a number of embodiments of the present disclosure. A number of embodiments of the present disclosure are described in the general context of computer-executable instructions, such as program instructions, being executed by a processor. Program instructions can include, for example, routines, programs, objects, components, data structures, etc., that can perform particular tasks and/or implement particular abstract data types.

One of ordinary skill in the art will appreciate that a number of embodiments of the present disclosure can be practiced with computing devices and systems other than the devices and system shown in FIG. 1. For example, a number of embodiments of the present disclosure can be practiced with hand-held devices, peripheral devices such as printers, facsimile devices, scanners, etc., mobile devices such as wireless devices, multiprocessor systems, microprocessor-based or programmable consumer electronics, network PCS, minicomputers, and/or mainframe computers. A number of embodiments of the present disclosure can also be practiced in a distributed computer environment where tasks are performed by remote processing devices that are linked through a communications network. In a distributed computing environment, program instructions in accordance with a number of embodiments of the present disclosure can be located in both local and remote memory storage devices.

In the embodiment shown in FIG. 1, computing system 100 includes computing device 102. Computing device 102 can be, for example, a personal computer (PC) such as a desktop PC, a server, a laptop, a workstation, etc. However, embodiments of the present disclosure are not limited to a particular type of computing device. Computing device 102 includes processor 121 and memory 122. Processor 121 can include a single central-processing unit (CPU) and/or a plurality of processing units in a parallel processing environment. Memory 122 can include read only memory (ROM), e.g., ROM 124, and random access memory (RAM), e.g., RAM 125. However, embodiments of the present disclosure are not so limited, and can include, for example, dynamic random access memory (DRAM), synchronous dynamic random access memory (SDRAM), flash memory, electrically erasable programmable ROM (EEPROM), erasable programmable ROM (EPROM), and phase change random access memory (PCRAM), among other types of memory.

Computing device 102 also includes bus 123 that couples components of computing device 102, including processor 121 and memory 122. Bus 123 can be, for example, a memory bus, e.g., memory controller, a peripheral bus, and/or a local bus, and can use a number of bus architectures.

In a number of embodiments, memory 122 can store a number of cash surrender values and death benefit values of a life insurance policy. Each cash surrender value and/or death benefit value can be associated with a future point in time. For example, a first cash surrender value can be associated with a first future year, a second cash surrender value can be associated with a second future year, etc. The cash surrender values and/or death benefit values can be provided by an insurance carrier, e.g., insurance company, associated with the life insurance policy. The cash surrender values can be after-tax cash surrender values, e.g., the cash surrender value after accounting for any taxes applicable to the cash surrender value. For example, an after-tax cash surrender value can be determined by subtracting from the cash surrender value a basis in the policy at the point in time associated with the cash surrender value, multiplying the remainder by an assumed ordinary income tax rate, and subtracting this result from the cash surrender value.

In a number of embodiments, memory 122 can store program instructions executable by processor 121. The program instructions can include instructions to perform a statistical sampling method to determine a number of strategic values of a life insurance strategy which includes a life insurance policy at a particular future point in time using a death benefit value of the life insurance policy at the particular future point in time, e.g., the death benefit value stored in memory 122 that is associated with the particular future point in time, a cash surrender value of the policy at the particular future point in time, e.g., the cash surrender value stored in memory 122 that is associated with the particular future point in time, a mortality probability for an insured subject of the policy for the particular future point in time, and a projected investment return on a reinvestment of the death benefit value at the particular future point in time. The particular future point in time can be, for example, a particular future year, a particular future month, a particular future day, etc.

A strategic value can represent a probable amount of cash accessible from the strategy utilizing the underlying policy, e.g., an amount of cash available to the insured subject and/or the beneficiary of the policy, at the particular future point in time. The strategic value can be based on probabilities associated with the economic performance of the strategy, the mortality of the insured subject, and/or a return on a reinvestment of a death benefit, as will be described further herein.

For example, the statistical sampling method can include using the mortality probability for the insured subject to determine whether the insured subject is projected to die before, during, or after a particular future point in time. For ease of reference, the particular future point in time will be referred to as a particular future year. If the insured subject is projected to die after the particular future year, the statistical sampling method can use the cash surrender value associated with the particular future year as an interim strategic value of the strategy at the particular future year. If the insured subject is projected to die during the particular future year, the statistical sampling method can use the death benefit value as the interim strategic value of the strategy at the particular future year. If the insured subject is projected to die before the particular future year, the statistical sampling method can determine a projected investment return on a reinvestment of the previously-received death benefit value at the particular point in time, and can use the projected investment return as the interim strategic value of the strategy at the particular future year. This process can then be repeated through a number of iterations, e.g., the statistical sampling method can include repeating this process a number of times to determine a number of interim strategic values of the strategy at the particular future year. The statistical sampling method can then use, e.g., perform a number of statistical analyses on, the number of interim strategic values to determine a number of strategic values of the life insurance strategy at the particular future year. This process can then be repeated for a number of future years.

Each iteration can return a different interim strategic value. That is, a first number of iterations will use the cash surrender value as the interim strategic value, a second number of iterations will use the death benefit value as the interim strategic value, and a third number of iterations will use a projected investment return on a reinvestment of the death benefit value as the interim strategic value. The number of iterations which use the cash surrender value, death benefit value, and projected investment return as the interim strategic value can depend on the mortality probability. For example, if the particular future year is year ten, if the mortality probability indicates the insured subject has an 91% chance of dying after year ten, a 2% chance of dying during year ten, a 7% chance of dying prior to year ten, and if the statistical sampling method includes 10,000 iterations, the statistical sampling method will use the cash surrender value of the policy associated with year ten as the interim strategic value of the strategy at year ten approximately 9,100 times, the death benefit value of the policy as the interim strategic value approximately 200 times, and the death benefit value for the year of death sometime prior to year ten in the iteration plus a projected investment return on a reinvestment of the death benefit value from the year of death as the interim strategic value approximately 700 times. In the iterations in which the statistical sampling method projects the insured subject to die during years one to nine, the projected investment return on the reinvestment of the death benefit value can vary depending on which year the iteration projects the insured subject to die, e.g., depending on whether the death benefit payment will be paid in year one, year two, year three, year four, year five, year six, year seven, year eight, or year nine, as will be further described herein.

A statistical sampling method can include a statistical, mathematical, or computational algorithm, calculation, program, formula, equation, model, or method which can use a number of variables, quantities, or probabilities to determine, calculate, predict, or simulate a value, quantity, or result through a number of iterations. For example, a statistical sampling method can include a Monte Carlo method, an orthogonal sampling method, a Latin Hypercube sampling method, a Poisson sampling method, or a Cluster sampling method, among others.

A mortality probability, e.g., probability of death, for an insured subject for a particular future point in time can be determined by using, e.g., mathematically sampling, a mortality probability distribution. The mortality probability distribution can be based on an actuarial likelihood of whether the insured subject will die at the particular future point in time. The actuarial likelihood of death can be based on a number of statuses of the insured subject, including the age of the insured subject, the gender of the insured subject, and/or the underwriting status of the insured subject, and/or can be based on mortality tables developed by an insurance company, e.g., the insurance company associated with the life insurance policy, or general published mortality tables, e.g., the Commissioners Standard Ordinary tables. The underwriting status of the insured subject can be based on the presence or absence of a number of risk factors associated with the insured subject that the insurance company may consider in determining the amount and/or cost of the life insurance coverage it may provide to the insured subject.

A projected investment return on a reinvestment of the death benefit value at the particular future point in time can be based on a previous projected mortality event. For example, the projected investment return on the reinvestment of the death benefit value at the particular future point in time can be based on a hypothetical investment of the death benefit value made at the time of the previous projected mortality event and continued through the particular future point in time. That is, if an iteration of the statistical sampling method determines that the insured subject will die five years before the particular future point in time, the projected investment return at the particular future point in time can be based on a hypothetical investment of the death benefit value made five years before the particular future point in time and continued through the particular future point in time.

A projected investment return on a reinvestment of the death benefit value can be determined using a hypothetical investment return rate. The hypothetical investment return rate can be based on a number of current investment rates in a number of investment vehicles, such as stocks, bonds, mutual funds, real estate and/or commodities, among other investment vehicles. For example, a hypothetical investment return rate can be determined by using, e.g., statistically sampling, an investment return rate probability distribution that is based on a number of hypothetical returns on a number of hypothetical investments, wherein the number of hypothetical returns are based on current investment returns in a number of investment vehicles. An investment return can then be determined by multiplying the death benefit value by (1+the hypothetical investment return rate).

In a number of embodiments, memory 122 can store a number of amounts of money paid into the life insurance policy. An amount of money paid into the policy can be the amount of money paid by the insured subject to the insurance company, e.g., the amount of the premium(s) paid by the insured subject. Each amount of money paid can be associated with a future point in time, e.g., each amount of money paid can be the amount of money paid by the insured subject up to a future point in time. For example, a first amount of money paid can be associated with a first future year, a second amount of money paid can be associated with a second future year, etc. The number of amounts of money paid can be provided by an insurance carrier, e.g., insurance company, associated with the life insurance policy.

In a number of embodiments, the program instructions stored in memory 122 can include instructions to determine a number of numerical index values for the life insurance strategy at particular future points in time. The numerical index value at a particular future point in time can be determined using the strategic value of the life insurance strategy at the particular future point in time and the amount of money, e.g., premiums, paid into the life insurance policy up to the particular future point in time. For example, the numerical index value at a particular future point in time can be determined by dividing the discounted present value of the strategic value at the particular future point in time by the sum of the discounted present values of the amount of money paid into the life insurance policy up to the particular future point in time. The discounted present value of the strategic value at a particular future point in time and the amount of money paid up to the particular future point in time can be determined by multiplying the strategic value and the amount of money paid, respectively, by a factor equal to one minus the selected discount rate expressed decimally, and repeating this step for the resulting amount for each year since the inception of the policy. The numerical index values can provide a comparison of the economic leverage of the premiums to the strategic value in cases where the compared policies do not have identical premiums or timing of premiums.

In a number of embodiments, the program instructions stored in memory 122 can include instructions to arrange the strategic values of the life insurance strategy for a particular future point in time in an order of strategic value, such as from greatest strategic Value to least strategic value, and the numerical index values in an order of numerical index values, such as from greatest numerical index value to least numerical index value. In a number of embodiments, the program instructions stored in memory 122 can include instructions to determine a percentile ranking of each strategic value and/or numerical index value, a maximum strategic value and/or numerical index value, a minimum strategic value and/or numerical index value, a mean strategic value and/or numerical index value, a median strategic value and/or numerical index value, and/or a mode strategic value and/or numerical index value.

As shown in FIG. 1, memory 122 includes ROM 124 and RAM 125. ROM 124 can include, e.g., store, a basic input/output system (BIOS) 126. BIOS 126 can include basic routines, e.g., instructions, that assist the transfer of information between the components of computing device 102. For example, BIOS 126 can include instructions that assist in the transfer of information between the components of computing device 102 during a start-up operation of computing device 102.

In the embodiment illustrated in FIG. 1, computing device 102 includes hard disk drive 127, magnetic disk drive 128, and optical disk drive 130. Hard disk drive 127 can read from and/or write to a hard disk (not shown in FIG. 1). Magnetic disk drive 128 can read from and/or write to a removable magnetic disk, e.g., magnetic disk 129. Optical disk drive 130 can read from and/or write to a removable optical disk, e.g., optical disk 131. Optical disk 131 can be, for example, a CD ROM, among other optical media. Hard disk drive 127, magnetic disk drive 128, and optical disk drive 130 are coupled with hard disk drive interface 132, magnetic disk drive interface 133, and optical disk drive interface 134, respectively.

Disk drives 127, 128, and 130, and their associated disks, can provide non-volatile storage of computer readable instructions, data structures, program modules, and other data for computing device 102. For example, disk drives 127, 128, and 130, and their associated disks, can provide program instructions in accordance with a number of embodiments of the present disclosure.

One of skill in the art will appreciate that computing system 100 is not limited to disk drives 127, 128, and 130, and their associated disks. Rather, computing system 100 can include any type of drive and associated computer-readable media which can store data, e.g., program instructions in accordance with a number of embodiments of the present disclosure, accessible by computing device 102. For example, computing system 100 can include a flash drive and associated flash memory card or a solid state drive and associated solid state device.

In a number of embodiments, ROM 124, RAM 125, the hard disk associated with hard disk drive 127, magnetic disk 129, and/or optical disk 131 can include a number of program modules, such as operating system 135, application programs 136, other program modules 137, and program data 138. The number of program modules can include program instructions in accordance with a number of embodiments of the present disclosure.

A user of computing device 102 can enter commands, e.g., commands to execute program instructions in accordance with a number of embodiments of the present disclosure, or information, e.g., information associated with or related to a number of embodiments of the present disclosure, into computing device 102 through input devices, such as keyboard 140 and mouse 142. However, as will be understood by one of skill in the art, computing system 100 is not limited to keyboard 140 and mouse 142, and can include other types of input devices, such as a microphone, joystick, or game pad. In the embodiment shown in FIG. 1, the input devices, e.g., keyboard 140 and mouse 142, are coupled to processor 121 through serial port interface 146 and bus 123. However, as will be understood by one of skill in the art, the input devices can be coupled to processor 121 through other interfaces, such as a parallel port, game port, or universal serial bus (USB).

As shown in FIG. 1, computing system 100 can include a display device, e.g., monitor 147. The display device can display strategic values of a life insurance strategy and/or numerical index values of a life insurance strategy determined in accordance with a number of embodiments of the present disclosure. As will be appreciated by one of skill in the art, computing system 100 is not limited to monitor 147, and can include other types of display devices. Monitor 147 can be coupled to processor 121 through an interface, e.g., video adapter 148, and bus 123. Monitor 147 can include a graphical user interface (GUI). Additionally, computing system 100 can include a number of peripheral devices, such as printers, facsimile devices, scanners, etc. (not shown in FIG. 1) coupled to computing device 102, e.g., to processor 121.

Computing device 102 can operate in a networked environment using logical connections to a number of remote computing devices, such as remote computing device 149. Remote computing device 149 can be, for example, a PC such as a desktop or network PC, a server, a laptop, a workstation, a router, a client, a peer device, or other network node. In a number of embodiments, remote computing device 149 can include any or all of the elements described in connection with computing device 102. For example, computing device 149 can include program instructions in accordance with a number of embodiments of the present disclosure.

As shown in FIG. 1, the logical connections can include a network, such as local area network (LAN) 151 and/or wide area network (WAN) 152. LAN 151 and/or WAN 152 can include, for example, an office network, enterprise-wide computer networks, intranets, or the Internet, among other types of networks. The logical connections, e.g., LAN 151 and WAN 152, can be achieved by a communication device coupled to or a part of computing device 102. For example, when used in a LAN-networking environment, computing device 102 can be connected to LAN 151 through a network interface, e.g., adapter, 153. When used in a WAN-networking environment, computing device 102 can be connected to WAN 152 through modem 154. As shown in FIG. 1, modem 154 can be coupled to bus 123 through serial port interface 146. However, as will be understood by one of skill in the art, computing device 102 can be connected to LAN 151 and/or WAN 152 through other communication devices, such as a wireless communication device. Additionally, as will be understood by one of skill in the art, means other than LAN 151 and/or WAN 152 can be used to establish a connection between computing device 102 and remote computing device 149.

Figures 2, 2A:
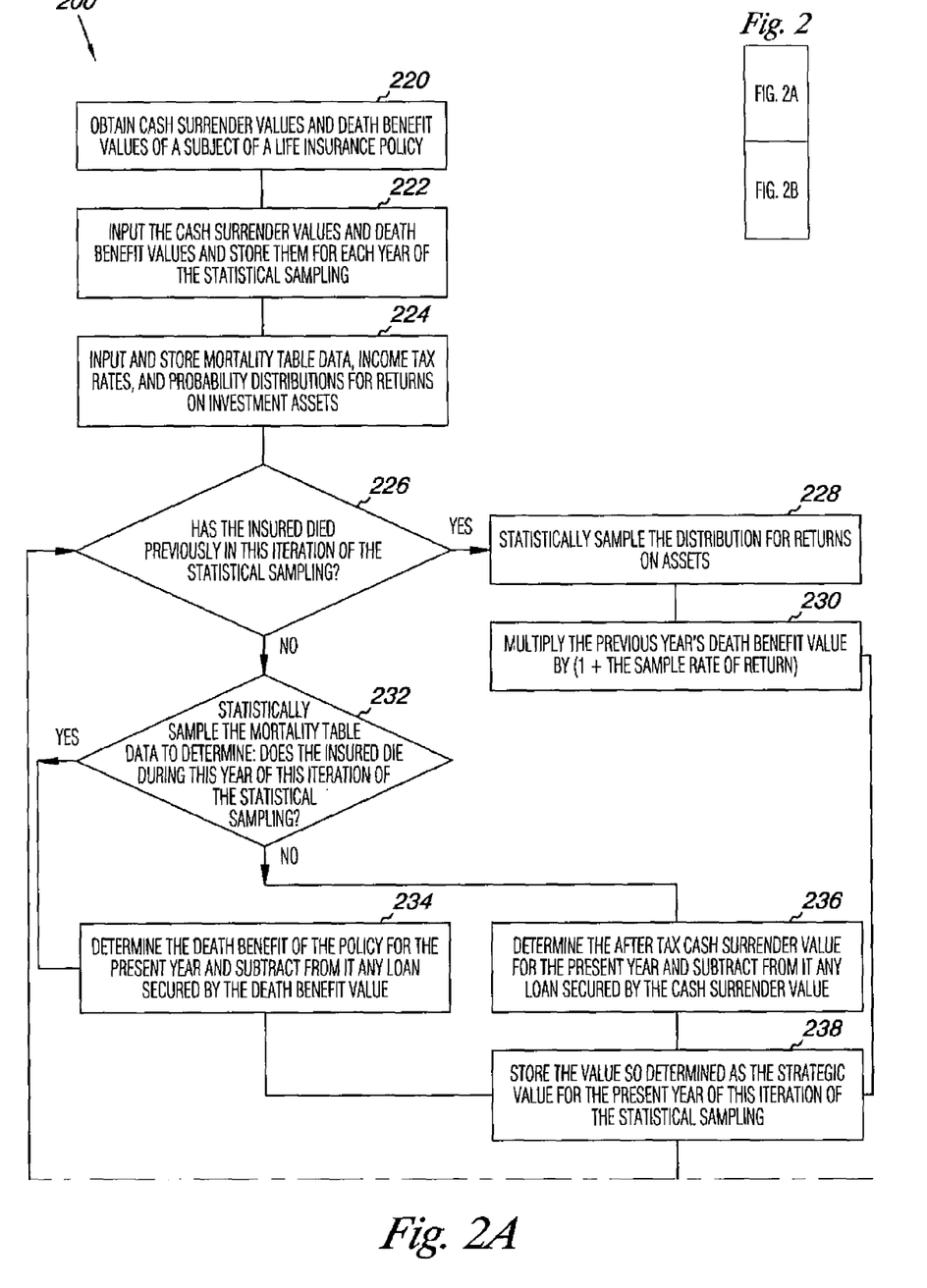
FIGS. 2A-2B illustrate a block diagram of a method which includes a statistical sampling method in accordance with a number of embodiments of the present disclosure.
Figure 2B:
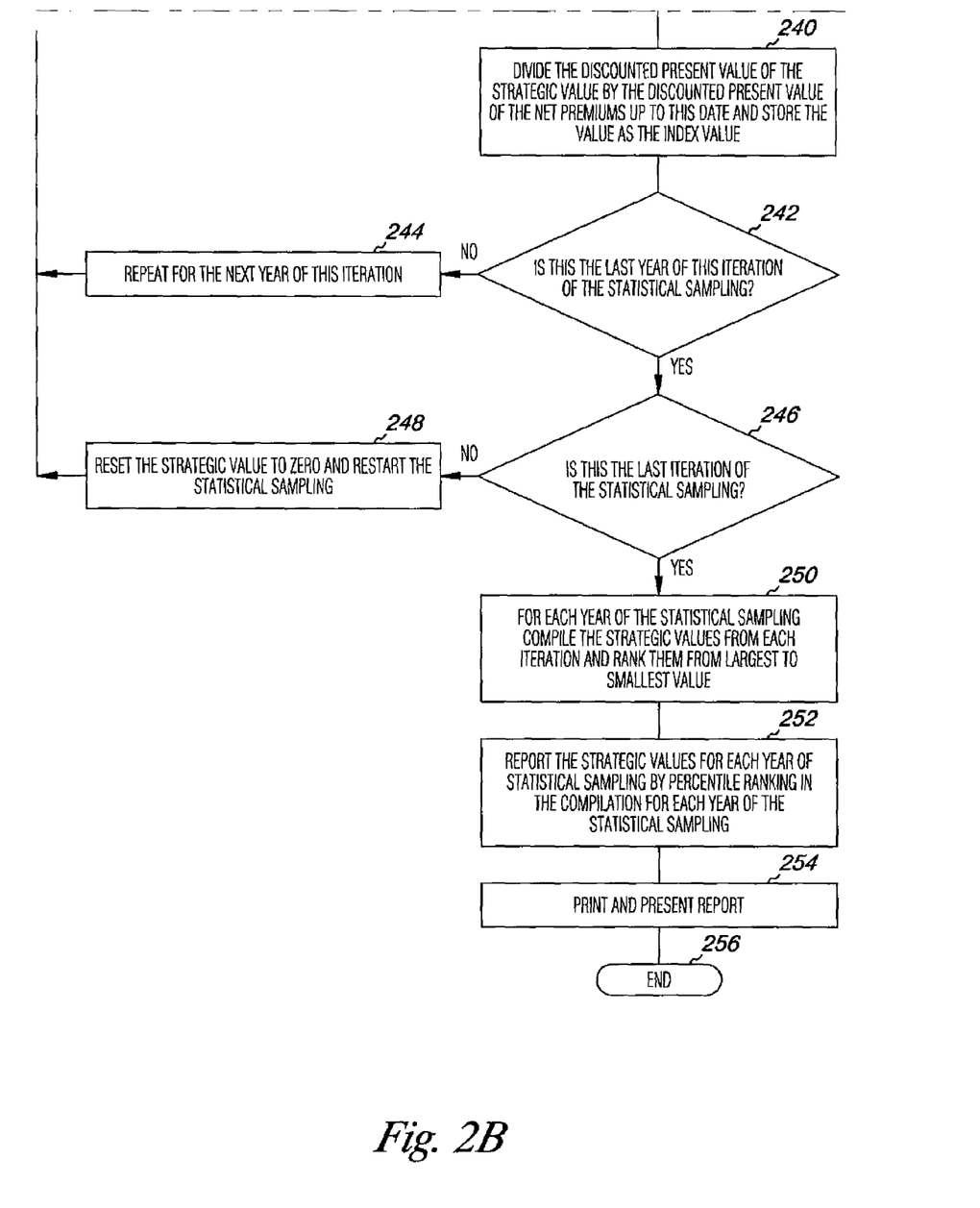

FIGS. 2A-2B illustrate a block diagram of a method 200 which includes a statistical sampling method in accordance with a number of embodiments of the present disclosure. In a number of embodiments, method 200 can include a statistical sampling method to determine a number of strategic values and/or numerical index values of a life insurance strategy in accordance with a number of embodiments of the present disclosure. The statistical sampling method can include a number of iterations for a number of future points in time, as previously described herein. Unless explicitly stated, the method embodiments described herein are not constrained to a particular order or sequence. Additionally, some of the described method embodiments or elements thereof can occur or be performed at the same point in time.

In a number of embodiments, the method embodiments described herein can be carried out by executable instructions stored in memory, e.g., memory 122 shown in FIG. 1 and executed by a processor, e.g., processor 121 shown in FIG. 1, in a computing device, e.g., computing device 102 shown in FIG. 1. The executable instructions can also be included in a computer readable medium. A computer readable medium can be a medium that can store computer readable information thereon, such as optically or magnetically readable forms of media, solid state storage devices, and/or volatile and/or non-volatile memory stored on fixed or removable mediums, such as hard drives, e.g., hard disk drive 127 shown in FIG. 1, disks, e.g., magnetic disk 129 or optical disk 131 shown in FIG. 1, memory cards, and the like, among other types of media.

As shown in FIG. 2A, a number of cash surrender values and death benefit values of a subject of a life insurance policy are obtained at 220. Each cash surrender value and/or death benefit value can be associated with a future point in time, as previously described herein. For ease of reference, the future points in time will be referred to as future years. The cash surrender values and/or death benefit values can be provided by an insurance carrier associated with the life insurance policy, and the cash surrender values can be after-tax cash surrender values, as previously described herein.

The cash surrender values and death benefit values for each year of the statistical sampling method are input and stored at 222. A number of mortality probability distributions, e.g., mortality table data, income tax rates, and probability distributions for returns on investment assets are input and stored at 224. The mortality probability distributions can be based on an actuarial likelihood of whether the insured subject will die at the particular future point in time, as previously described herein. The probability distributions for returns on investment assets can be based on a number of hypothetical returns on a number of hypothetical investments, as previously described herein.

A determination of whether the insured subject is projected to die before a particular future point in time, e.g., before the present year of this iteration of the statistical sampling method, is made at 226. This determination can be made by using, e.g., statistically sampling, the mortality probability distributions, e.g., mortality table data, input and stored at 224.

If the insured subject is projected to die before the present year of this iteration of the statistical sampling method, the probability distributions for returns on investment assets input and stored at 224 are statistically sampled at 228 to determine a hypothetical, e.g., sample, rate of return. The death benefit value associated with the year in which the insured subject was projected to die is multiplied at 230 by (1+the hypothetical rate of return determined at 228), and the value so determined is stored at 238 as the strategic value of the strategy for the present year of this iteration of the statistical sampling method.

If the insured subject is not projected to die before the present year of this iteration of the statistical sampling method, a determination of whether the insured subject is projected to die during the present year of this iteration is made at 232. This determination can be made by using, e.g., statistically sampling, the mortality probability distributions, e.g., mortality table data, input and stored at 224.

If the insured subject is projected to die during the present year of this iteration of the statistical sampling method, the death benefit value of the policy for the present year of this iteration is determined at 234 from the death benefit values input and stored at 222, and the death benefit value for the present year of this iteration is stored at 238 as the strategic value of the strategy for the present year of this iteration of the statistical sampling method. In a number of embodiments, the amount of any loan secured by the death benefit value can be subtracted at 234 from the death benefit value for the present year of this iteration, and the value so determined can be stored at 238 as the strategic value of the strategy for the present year of this iteration.

If the insured subject is not projected to die before or during the present year of this iteration of the statistical sampling method, e.g., if the insured subject is projected to be alive during the present year of this iteration, the cash surrender value of the policy for the present year of this iteration is determined at 236 from the cash surrender values input and stored at 222, and the cash surrender value for the present year of this iteration is stored at 238 as the strategic value of the strategy for the present year of this iteration of the statistical sampling method. The cash surrender value can be an after-tax cash surrender value, as previously described herein. In a number of embodiments, the amount of any loan secured by the cash surrender value can be subtracted at 236 from the cash surrender value for the present year of this iteration, and the value so determined can be stored at 238 as the strategic value of the strategy for the present year of this iteration.

The strategic value stored at 238 is divided by the net amount of money paid into the policy up to the present year of this iteration, and the value so determined is stored at 240 as the numerical index value for the strategy for the present year of this iteration of the statistical sampling method. The strategic value stored at 238 can represent a probable amount of cash accessible from the strategy at the present year of the iteration. In a number of embodiments, the discounted present value of the strategic value stored at 238 can be divided by the discounted present value of the net amount of money paid into the policy up to the present year of this iteration, as previously described herein, and the value so determined can be stored at 240 as the numerical index value for the strategy for the present year of this iteration.

A determination of whether the present year of this iteration of the statistical sampling method is the last year of this iteration of the statistical sampling method is made at 242. If the present year of this iteration is not the last year of this iteration, the statistical sampling method is repeated for the next year of this iteration, e.g., the method returns to 226 for the next year of this iteration.

If the present year of this iteration is the last year of this iteration, a determination of whether the present iteration is the last iteration of the statistical sampling method is made at 246. If the present iteration is not the last iteration of the statistical sampling method, the strategic value of the strategy is reset to zero at 248, and the statistical sampling method is restarted, e.g., the method returns to 226 for the next iteration of the statistical sampling method.

If the present iteration is the last iteration of the statistical sampling method, the strategic values of the strategy from each iteration of the statistical sampling method are compiled at 250 and ranked from largest to smallest value. In a number of embodiments, the numerical index values for the strategy from each iteration of the statistical sampling method can also be compiled and ranked from largest to smallest value at 250.

The strategic values of the strategy for each year of the statistical sampling method are reported at 252 by percentile ranking in the compilation for each year of the statistical sampling method. In a number of embodiments, the numerical index values for the strategy for each year of the statistical sampling method can also be reported at 252 by percentile ranking in the compilation for each year of the statistical sampling method.

The report of the strategic values and/or numerical index values is printed and presented at 254, and the method is concluded at 256. The report can be printed using, for example, a printer coupled to computing device 102 shown in FIG. 1. In a number of embodiments, the report can include a table, e.g., spreadsheet, of the strategic values and/or numerical index values. An example of such a report is described further in connection with FIGS. 4A-4F.

In a number of embodiments, the report can be presented to a consumer, such as the insured subject or a person considering purchasing an insurance policy. A consumer can use the report, e.g., the strategic values and/or numerical index values included in the report, to determine a probable amount of cash accessible from the strategy at a particular future point in time. A consumer can also use the report to compare the strategy with other life insurance strategies and/or an investment vehicle(s) other than life insurance. For example, a consumer considering whether to purchase a particular life insurance policy can use a number of strategic values and/or numerical index values determined in accordance with a number of embodiments of the present disclosure to determine whether it would most beneficial to purchase the particular life insurance policy, to finance the particular life insurance policy in a different manner, or to participate in an investment vehicle(s) other than life insurance.

Figure 3:
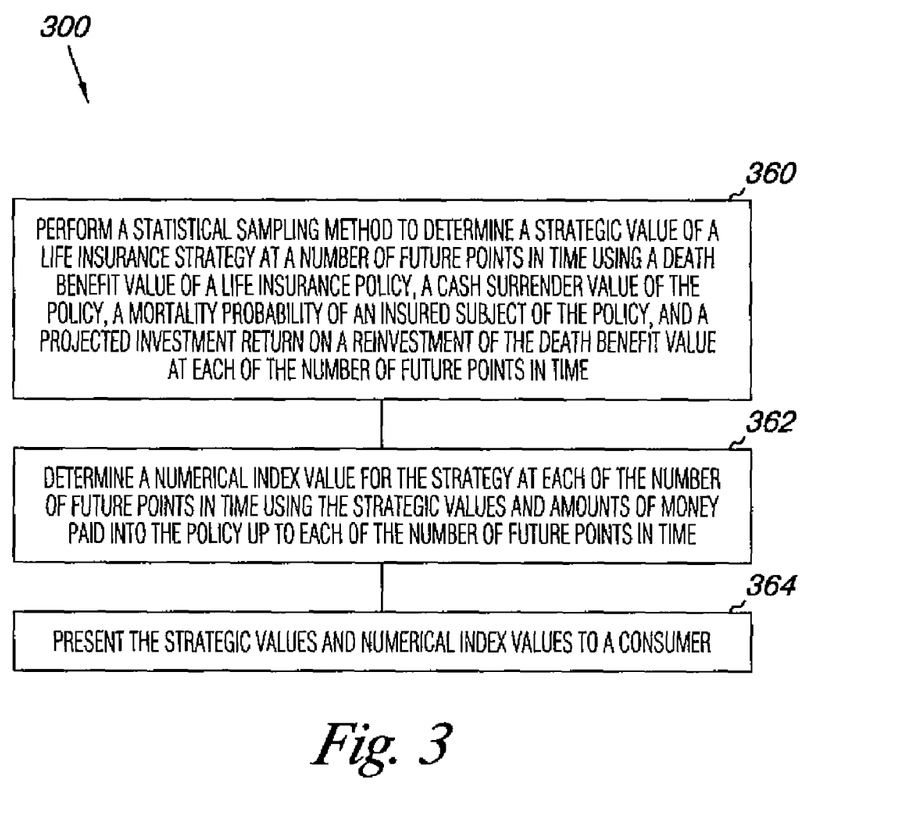
FIG. 3 illustrates a block diagram of a method which includes a statistical sampling method in accordance with a number of embodiments of the present disclosure.
Figures 4, 4A:
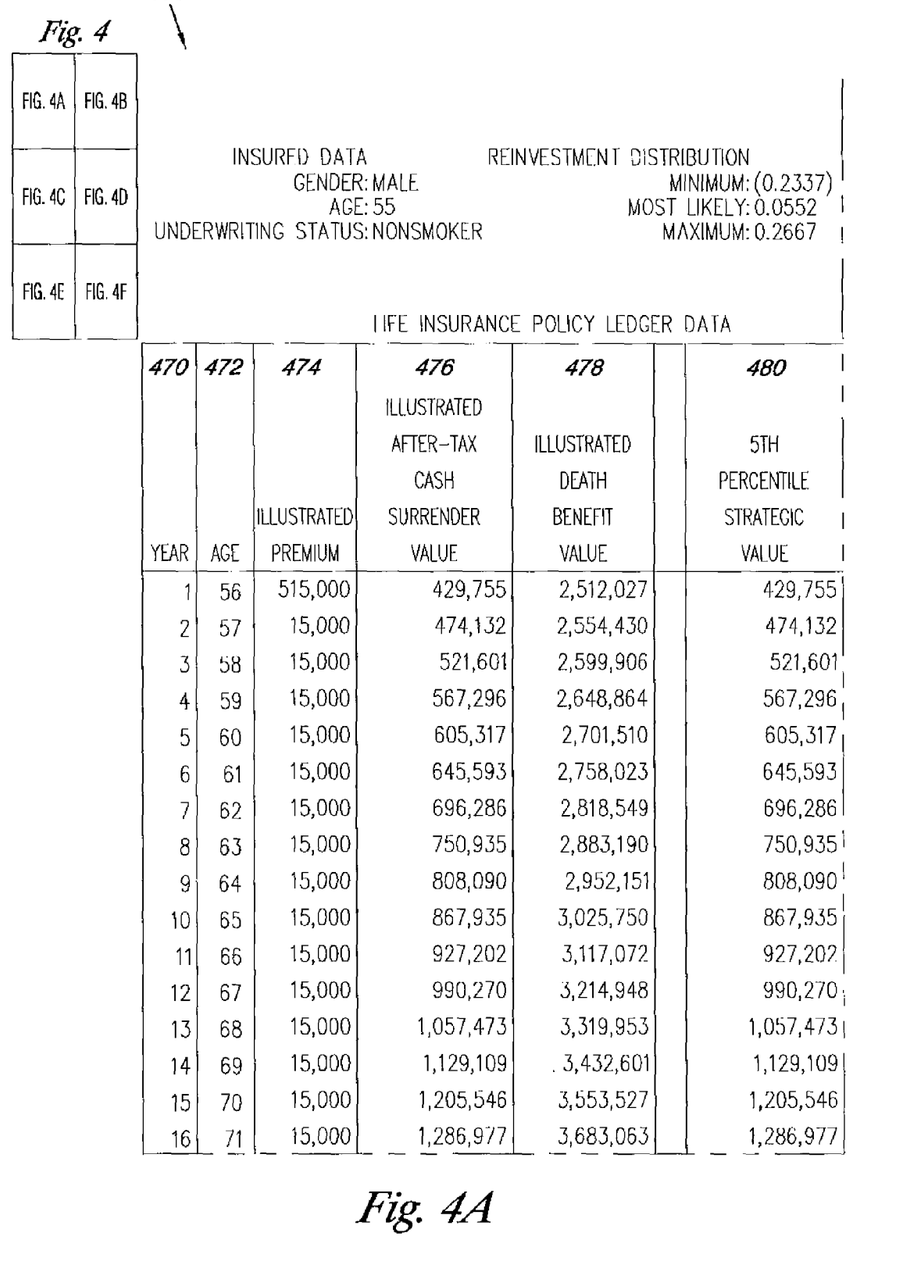
FIGS. 4A-4F illustrate a table of strategic values and numerical index values of a life insurance strategy determined in accordance with a number of embodiments of the present disclosure.
Figure 4B:
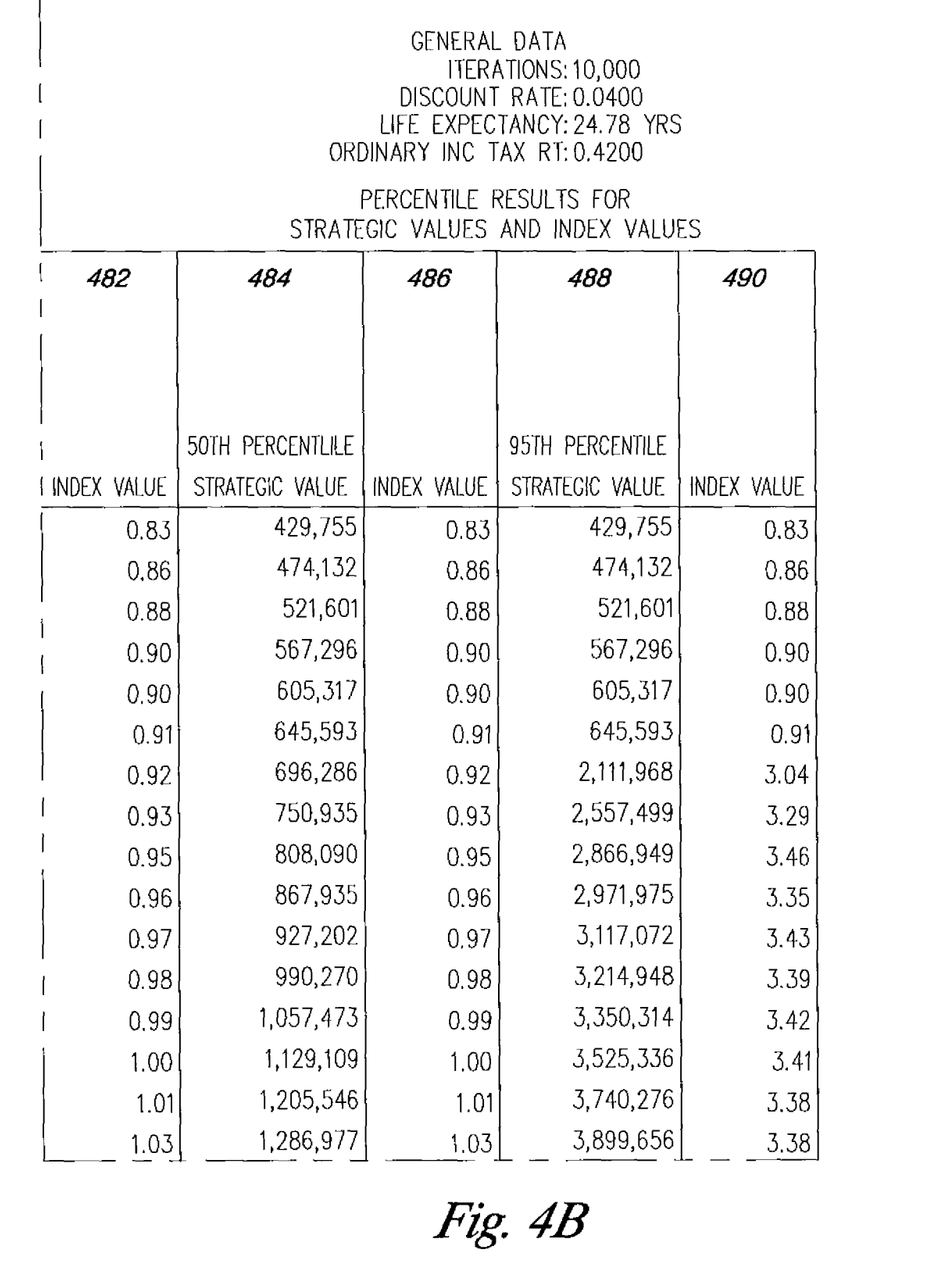
Figure 4C:
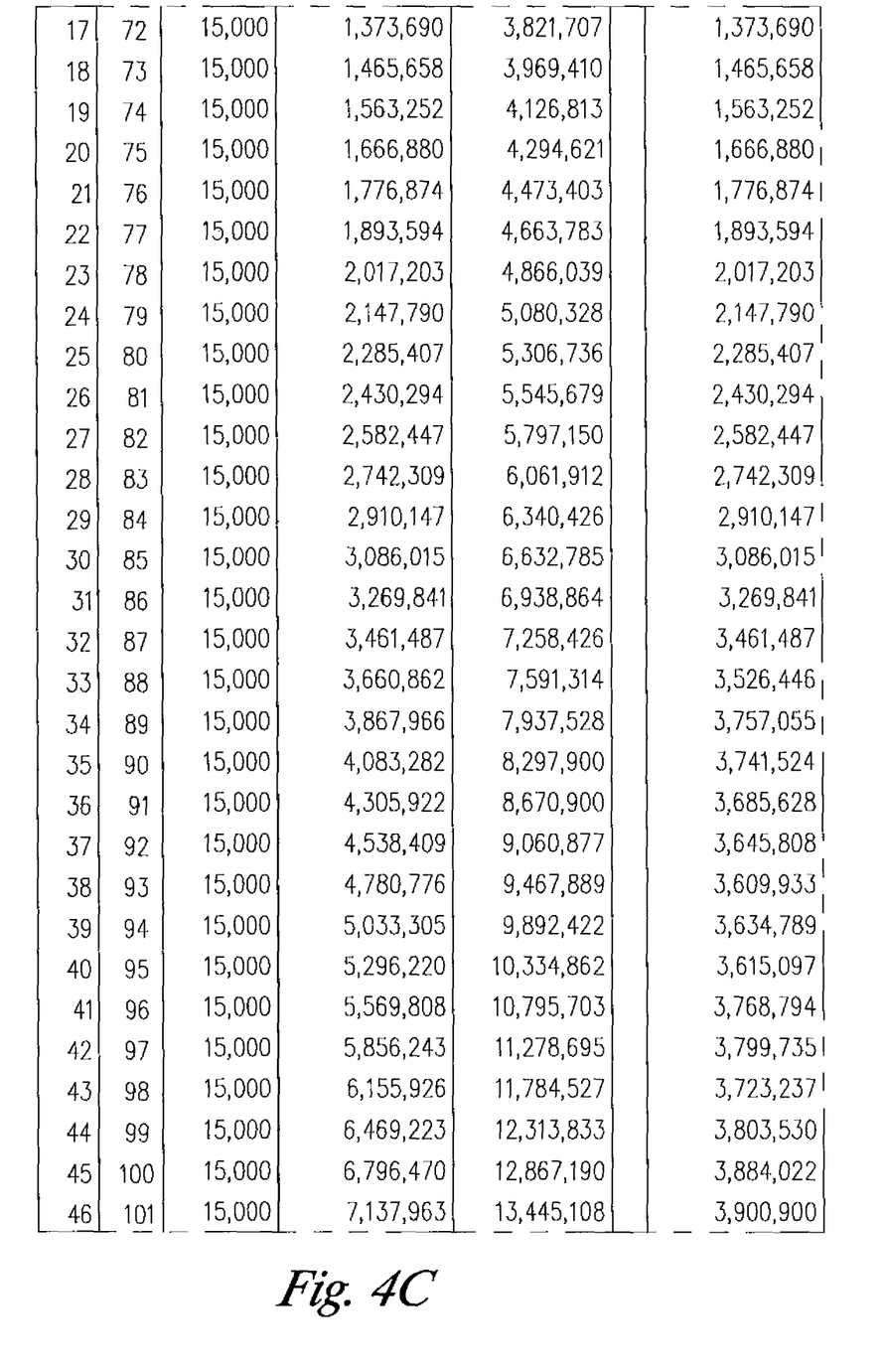
Figure 4D:
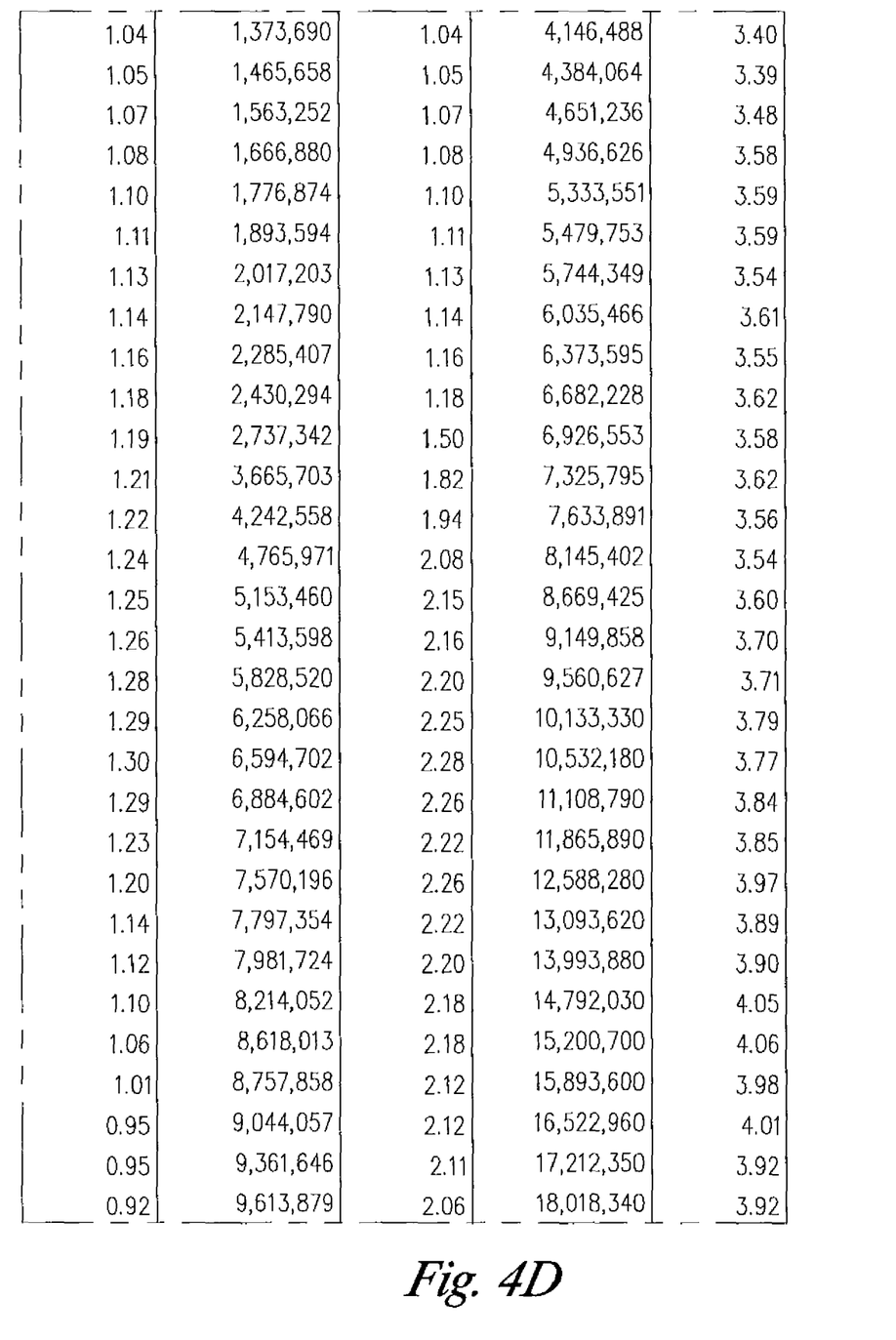
Figure 4E:
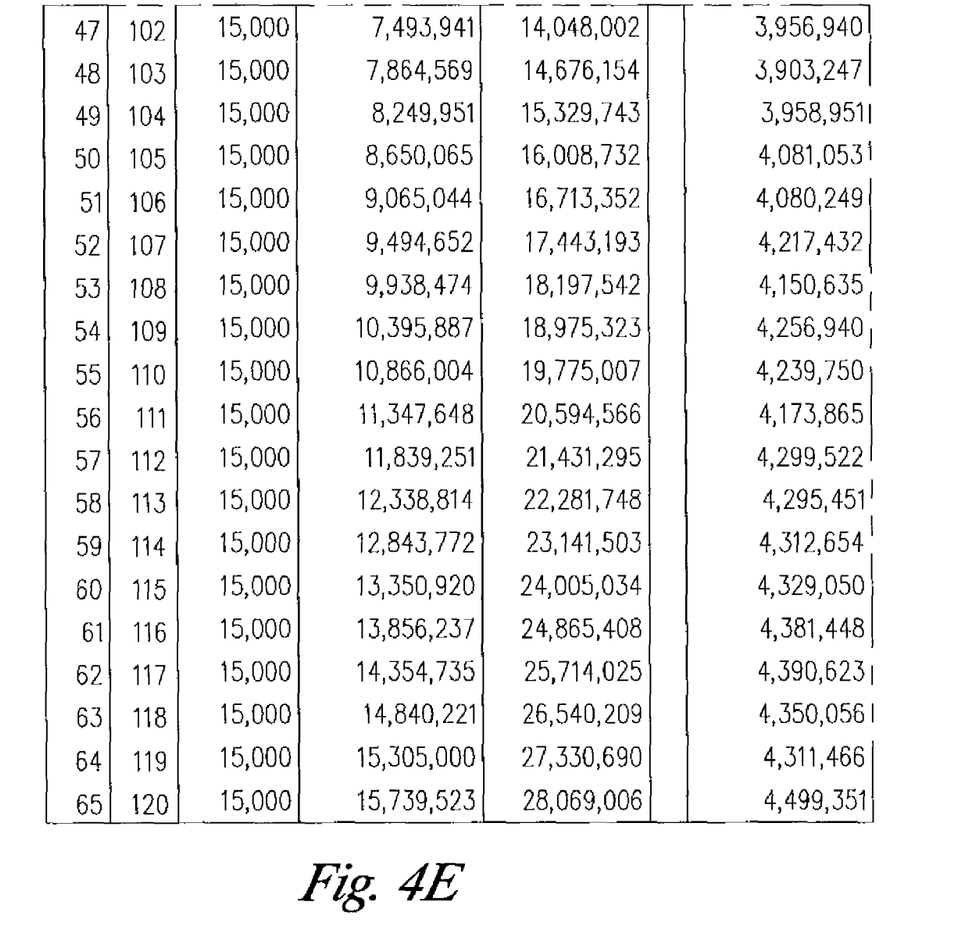
Figure 4F:
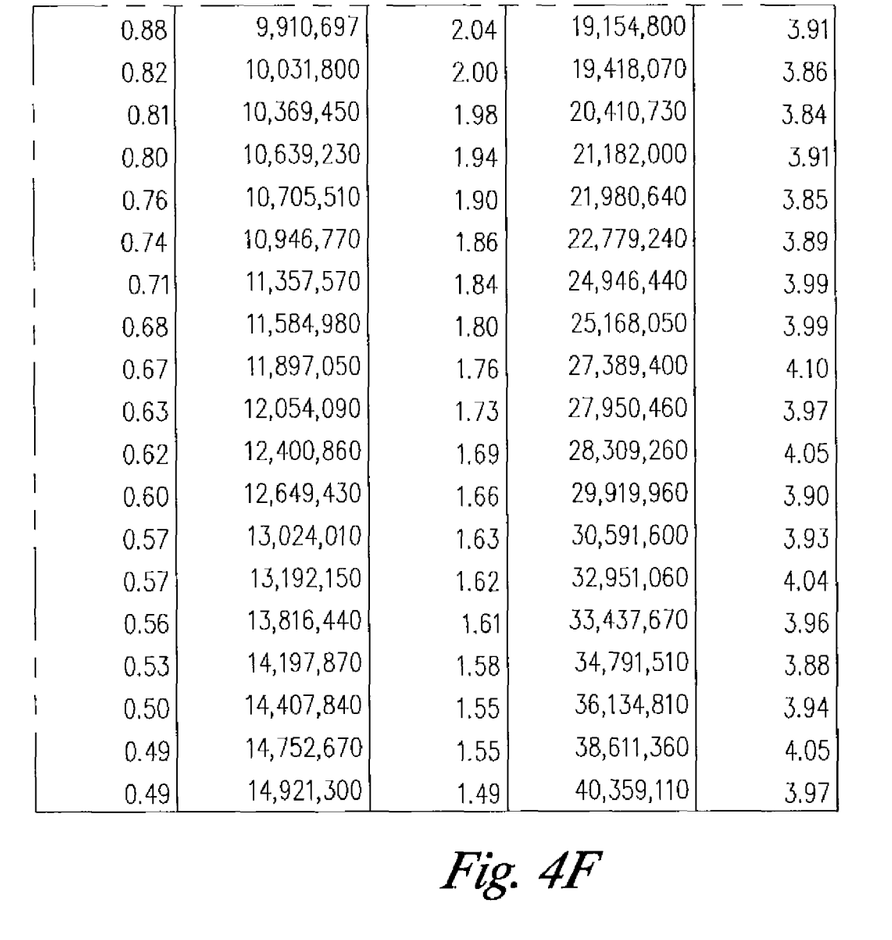

FIG. 3 illustrates a block diagram of a method 300 which includes a statistical sampling method in accordance with a number of embodiments of the present disclosure. As shown in FIG. 3, a statistical sampling method to determine a strategic value of a life insurance strategy at a number of future points in time is performed at 360. The statistical sampling method can determine the strategic value of the strategy at the number of future points in time using a death benefit value of a life insurance policy, e.g., a life insurance policy associated with the strategy, a cash surrender value of the policy, a mortality probability for an insured subject of the policy, and a projected investment return on a reinvestment of the death benefit value at each of the number of future points in time, in accordance with a number of embodiments previously described herein.

At 362, a numerical index value for the strategy at each of the number of future points in time is determined using the strategic values and amounts of money paid into the policy up to each of the number of future points in time, in accordance with a number of embodiments previously described herein. The strategic values and numerical index values can be presented to a consumer, e.g., the insured subject or a person considering purchasing an insurance policy, at 364. A consumer can use the strategic values and/or numerical index values to determine a probable amount of cash accessible from the strategy at a particular future point in time and/or to compare the strategy with other life insurance strategies and/or an investment vehicle(s) other than life insurance, as previously described herein.

In a number of embodiments, presenting the strategic values and numerical index values can include using a printer to print a report of the strategic values and numerical index values, e.g., a report including a table of the strategic values and numerical index values, as previously described herein and further described in connection with FIGS. 4A-4F.

FIGS. 4A-4F illustrate a table 400 of strategic values and numerical index values of a life insurance strategy determined in accordance with a number of embodiments of the present disclosure. The insured subject for whom table 400 was generated is a 55 year old male having an underwriting status of non-smoking. The insured subject has a remaining life expectancy of 24.78 years, which can be based on a mortality probability distribution, as previously described herein.

The investment return rate probability distribution used to determine the strategic and numerical index values in table 400 includes a minimum hypothetical investment return rate of (0.2337), e.g., the minimum hypothetical investment return rate is a negative return rate, a maximum hypothetical investment return rate of 0.2667, and a most likely hypothetical investment return rate of 0.0552. These hypothetical investment return rates can be based on a number of current investment rates in a number of investment vehicles, as previously described herein. The discount rate and income tax rate used to determine the strategic and numerical index values in table 400 are 0.0400 and 0.4200, respectively. The statistical sampling method used to determine the strategic and numerical index values in table 400 includes 10,000 iterations.

Column 470 of table 400 includes the future years for which the strategic and numerical index values were determined. That is, each row in table 400 corresponds to a particular future year. Column 472 of table 400 includes the age of the insured subject at each future year.

Columns 474, 476, and 478 of table 400 include data relating to the underlying life insurance policy of the life insurance strategy used to determine the strategic and numerical index values in table 400. Column 474 includes the premium paid into the policy each future year. Column 476 includes the after-tax cash surrender value of the policy for each future year. Column 478 includes the death benefit value of the policy for each future year. The premiums in column 474, cash surrender values in column 476, and death benefit values in column 478 can be provided by an insurance carrier associated with the life insurance policy, as previously described herein.

Columns 480, 484, and 488 of table 400 include strategic values of the life insurance strategy for each future year determined in accordance with one or more embodiments of the present disclosure, and columns 482, 486, and 490 of table 400 include numerical index values for the life insurance strategy for each future year determined in accordance with one or more embodiments of the present disclosure. Each of columns 480, 482, 484, 486, 488, and 490 is associated with a percentile ranking. For example, column 480 includes the strategic values of the strategy ranked in the 5th percentile for each future year, and column 482 includes the numerical index values for the strategy ranked in the 5th percentile for each future year. Column 484 includes the strategic values of the strategy ranked in the 50th percentile for each future year, and column 486 includes the numerical index values for the strategy ranked in the 50th percentile for each future year. Column 488 includes the strategic values of the strategy ranked in the 95th percentile for each future year, and column 490 includes the numerical index values for the strategy ranked in the 95th percentile for each future year.

CONCLUSION

The present disclosure includes devices, methods, and systems for determining the strategic value of a life insurance strategy at a future point in time. One device embodiment can include a processor, a memory coupled to the processor, and program instructions stored in the memory and executable by the processor to perform a statistical sampling method to determine a strategic value of a life insurance strategy at a number of particular future points in time using a death benefit value of a life insurance policy, a cash surrender value of the policy, a mortality probability for an insured subject of the policy, and a projected investment return on a reinvestment of the death benefit value, at each of the number of particular future points in time.

Although specific embodiments have been illustrated and described herein, those of ordinary skill in the art will appreciate that an arrangement calculated to achieve the same results can be substituted for the specific embodiments shown. This disclosure is intended to cover adaptations or variations of a number of embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description.

The scope of the number of embodiments of the present disclosure includes other applications in which the above structures and methods are used. Therefore, the scope of a number of embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A computing device, comprising:
   a processor;
   a memory coupled to the processor; and
   program instructions stored in the memory and executable by the processor to perform a statistical sampling method to calculate a strategic value of a life insurance strategy at a number of particular future points in time over a number of iterations, wherein the processor utilizes:
   a death benefit value of a life insurance policy;
   a cash surrender value of the policy;
   a mortality probability for an insured subject of the policy that simulates mortality outcomes of the insured subject;
   a projected investment return on a reinvestment of the death benefit value;
   at each of the number of particular future points in time according to the number of iterations;
   wherein the program instructions are executable to calculate a numerical index value, based on a ratio of a discounted present value of an amount paid to the policy and a discounted present value of the calculated strategic value for the life insurance strategy; and
   wherein the program instructions execute to present the numerical index value of a life insurance policy via a user interface.

2. The device of claim 1, wherein the projected investment return is based on a previous projected mortality event.

3. The device of claim 1, wherein the statistical sampling method is a Monte Carlo method.

4. A computing device, comprising:
   a processor;
   a memory coupled to the processor;
   a number of cash surrender values and death benefit values of a life insurance policy stored in the memory, wherein each cash surrender value and death benefit value is associated with a future year; and
   program instructions stored in the memory and executable by the processor to perform a statistical sampling method to calculate a number of strategic values of a life insurance strategy at a particular future year over a number of iterations, wherein the processor utilizes:
   a death benefit value;
   a cash surrender value;
   a mortality probability for an insured subject of the policy that simulates mortality outcomes of the insured subject; and
   a projected investment return on a reinvestment of the death benefit value based on a previous projected mortality event;
   at the particular future year according to the number of iterations;
   wherein the program instructions are executable to calculate a numerical index value, based on a ratio of a discounted present value of an amount paid to the policy and a discounted present value of the strategic value for the life insurance strategy; and
   wherein the program instructions execute to present the strategic value of a life insurance policy via a user interface.

5. The device of claim 4, wherein the number of cash surrender values and death benefit values are provided by an insurance carrier associated with the policy.

6. The device of claim 4, wherein the number of strategic values of the life insurance strategy at the particular future year represent a number of probable amounts of cash accessible from the strategy at the particular future year.

7. The device of claim 4, wherein the program instructions are executable to determine a number of numerical index values for the strategy at the particular future year using the strategic values and an amount of money paid into the policy up to the particular future year.

8. A computer readable medium having instructions stored in a memory and executable by a processor to cause a device to perform a statistical sampling method, comprising:
   performing a statistical sampling method to calculate a strategic value of a life insurance strategy at a number of future points in time over a number of iterations, wherein the processor utilizes:
   a death benefit value of a life insurance policy;
   a cash surrender value of the policy;
   a mortality probability for an insured subject of the policy that simulates mortality outcomes of the insured subject; and
   a projected investment return on a reinvestment of the death benefit value at each of the number of future points in time according to the number of iterations;
   calculating a numerical index value for the strategy at each of the number of future points in time using the strategic values and amounts paid into the policy up to each of the number of future points in time; and
   presenting the strategic values and numerical index values to a consumer via a user interface.

9. The medium of claim 8, wherein each strategic value represents a probable amount of cash accessible from the strategy at a particular future point in time.

10. The medium of claim 8, wherein calculating the numerical index value at a particular future point in time includes dividing a discounted present value of the strategic value at the particular future point in time by a discounted present value of an amount of money paid into the policy up to the particular future point in time.

11. The medium of claim 8, wherein presenting the strategic values and numerical index values to a consumer includes arranging the strategic values and numerical index values in a table.

12. The medium of claim 11, wherein the table includes a number of rows and a number of columns, wherein:
    each row corresponds to one of the number of future points in time; and
    a number of columns correspond to a strategic value or a numerical index value associated with a particular percentile ranking.

13. A computer statistical sampling method for calculating a strategic value of a life insurance strategy at a number of particular future points in time by performing a number of iterations, wherein the sampling method comprises:
Using a computer processor to execute instructions, stored in a memory, to perform the steps of:
determining a death benefit value of a number of life insurance policies;
determining a cash surrender value of the number of life insurance policies;
utilizing a mortality probability for an insured subject of the policy that simulates mortality outcomes of the insured subject;
calculating a projected investment return on a reinvestment of the death benefit value;
at each of the number of particular future points in time according to the number of iterations;
calculating a numerical index value, based on a ratio of a discounted present value of an amount paid to the number of life insurance policies and a discounted present value of the strategic value, for the insurance strategy; and
presenting the numerical index value of a life insurance policy via a user interface.

14. The computer statistical sampling method of claim 13, wherein calculating the projected investment return includes:
calculating a hypothetical investment return rate based on a number of current investment return rates; and
multiplying the death benefit value by (1 +the hypothetical investment return rate).

* * * * *